(12) United States Patent
Zhang

(10) Patent No.: US 7,967,513 B2
(45) Date of Patent: Jun. 28, 2011

(54) REFLECTOR ASSEMBLY FOR USE WITH ELECTRONIC DEVICES

(75) Inventor: Yu Zhang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 12/567,921

(22) Filed: Sep. 28, 2009

(65) Prior Publication Data
US 2010/0142938 A1 Jun. 10, 2010

(30) Foreign Application Priority Data
Dec. 10, 2008 (CN) .......................... 2008 1 0306087

(51) Int. Cl.
*G03B 15/00* (2006.01)
(52) U.S. Cl. ........................................ 396/351; 396/544
(58) Field of Classification Search .................... 396/351
See application file for complete search history.

(56) References Cited

U.S. PATENT DOCUMENTS

| | | | | | |
|---|---|---|---|---|---|
| 4,235,541 | A | * | 11/1980 | Jamel | 396/432 |
| 4,380,787 | A | * | 4/1983 | Stone | 362/16 |
| 5,469,236 | A | * | 11/1995 | Roessel | 396/432 |
| 5,515,135 | A | * | 5/1996 | Katayama et al. | 396/85 |
| 5,697,594 | A | * | 12/1997 | Adams et al. | 248/442.2 |
| 6,742,943 | B2 | * | 6/2004 | Ushiro | 396/529 |
| 2007/0116454 | A1 | * | 5/2007 | Tsai | 396/287 |
| 2007/0280677 | A1 | * | 12/2007 | Drake et al. | 396/429 |

FOREIGN PATENT DOCUMENTS

JP 2005189474 A * 7/2005
* cited by examiner

*Primary Examiner* — Clayton E LaBalle
*Assistant Examiner* — Leon W Rhodes
(74) *Attorney, Agent, or Firm* — Steven M. Reiss

(57) ABSTRACT

A reflector assembly for use with an electronic device includes a light guiding member forming a light-guiding passage having a light guide assembly in the form of a plurality of lens assembled therein, the light guiding member is assembled in an electronic device having a display window formed in the front surface and a camera module formed in the back surface. An end of the light guiding member aligns with the camera module, the other end of the light guiding member extends to the front surface of the electronic device, outside lights can enter into light-guiding passage and be reflected by the lenses and reach to the camera module.

11 Claims, 4 Drawing Sheets

REFLECTOR ASSEMBLY FOR USE WITH ELECTRONIC DEVICES

BACKGROUND

1. Technical Field

The present disclosure relates to a reflector assembly for use with an electronic device.

2. Description of Related Art

With development of wireless communication technology, portable electronic devices such as mobile phones are widely used. A typical electronic device with image capturing function usually has a camera exposed out of one surface and a display window at another surface of the electronic device. After that photo is taken, a user can view a captured image on the display window.

However, it is inconvenient to simultaneously view the pre-captured image and take the photo.

Therefore, there is room for improvement within the art.

BRIEF DESCRIPTION OF THE DRAWING

Many aspects of the present reflector assembly using in electronic device can be better understood with reference to the following drawings. The components in the various drawings are not necessarily drawn to scale, the emphasis instead being placed upon clearly illustrating the principles of the present reflector assembly for use with an electronic device. Moreover, in the drawings, like reference numerals designate corresponding parts throughout the diagrams.

DETAILED DESCRIPTION OF THE EMBODIMENT

Figure 1:
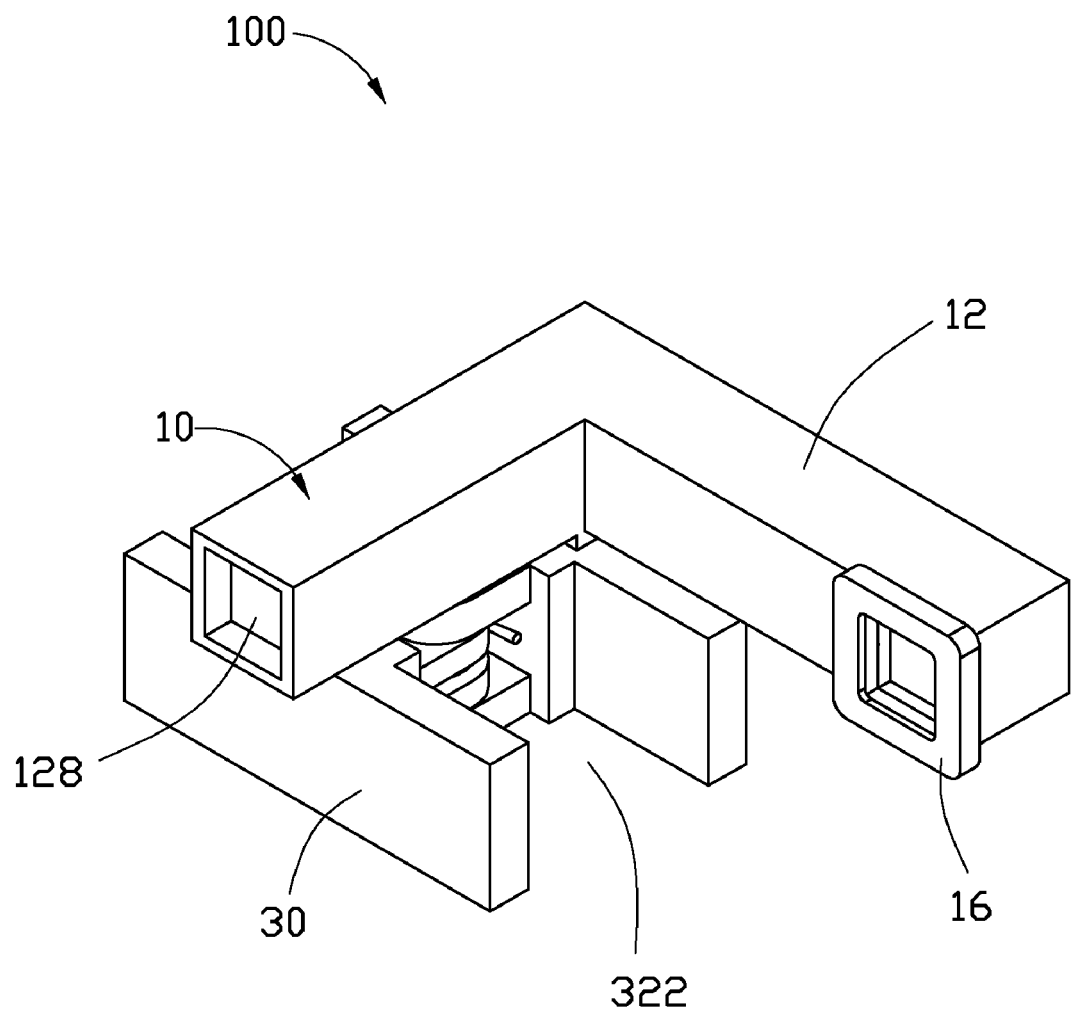
FIG. 1 is an assembled, isometric view of a reflector assembly according to an exemplary embodiment.
Figure 2:
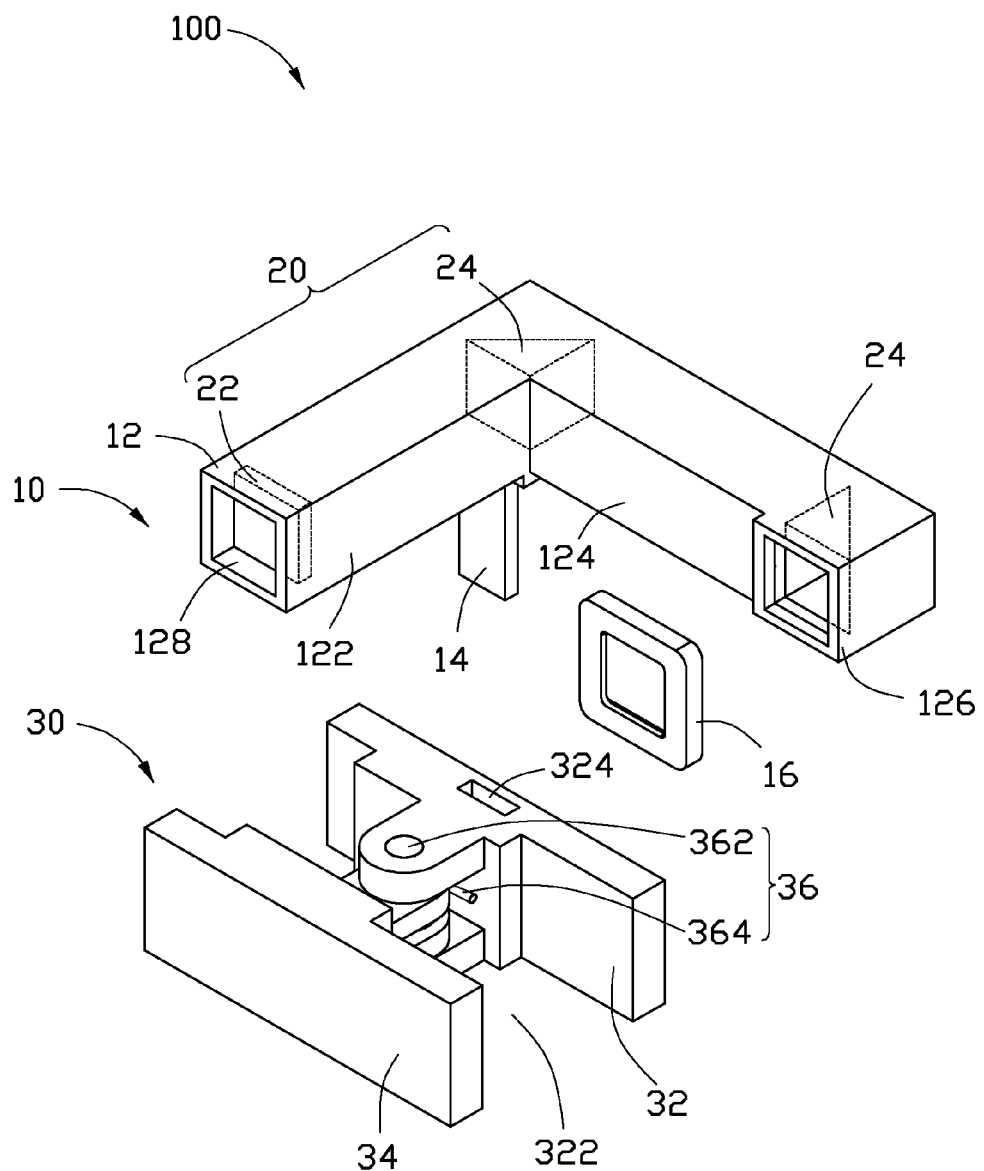
FIG. 2 is an exploded, isometric view of the reflector assembly shown in FIG. 1.

Referring to FIGS. 1 and 2, an exemplary reflector assembly 100 for mobile phones and other portable electronic devices includes a light guiding member 10, a plurality of lenses 20, and a clamp member 30. The lenses 20 are assembled in the light guiding member 10 to reflect imaging light. However, the lens may be replaced with other light transmitting elements such as fiber optics or light guides. The light guiding member 10 can be clamped on an electronic device by the clamp member 30.

The light guiding member 10 includes a sleeve 12, a supporting bar 14 and a cushion 16. The sleeve 12 generally includes a first connecting section 122, a second connecting section 124, and a third connecting section 126 for ultimately reversing the optical axis of incoming light. The first connecting section 122 and the third connecting section 126 are connected with the second connecting section 124. The first connecting section 122 and the third connecting section 126 are located at ends of the second connecting section 124. The first connecting section 122 is longer than the third connecting section 126. The supporting bar 14 extends downwardly from the bottom of an outer wall of the sleeve 12. The supporting bar is used to engage with the clamp member 30. The cushion 16 is made of rubber and configured for assembling with a tail end of the third connecting section 126.

The lenses 20 reflect light and are secured in a light-guiding passage 128 of the sleeve 12. The lenses 20 include a plane lens 22 and two light-bending lenses, such as three-prism lenses 24. The plane lens 22 is assembled in the entrance of the first connecting section 122. One of the three-prism lenses 24 are assembled at the corner of the first connecting section 122 and the second connecting section 124. The other of the three-prism lenses 24 are assembled at the corner of the second connecting section 124 and the third connecting section 126. The outside light can enter into the light-guiding passage 128 through and reflected by the plane lens 22, the two three-prism lenses 24.

The clamp member 30 can be assembled to the supporting bar 14 for clamping to an electronic device. The clamp member 30 includes a first clamping board 32, a second clamping board 34, and a hinge mechanism 36. The hinge mechanism 36 hinges the first clamping board 32 with the second clamping board 34. The hinge mechanism 36 includes a shaft 362 and a torsion spring 364. The shaft 362 connects the first clamping board 32 and the second clamping board 34. The torsion spring 364 is placed around the shaft 362 and biased by the first clamping board 32 and the second clamping board 34. The torsion spring 364 can provide torsion force for a clamping of the first clamping board 32 and the second clamping board 34. The first clamping board 32 and the second clamping board 34 cooperatively define a clamping opening 322. The first clamping board 32 defines a connecting hole 324 to secure the supporting bar 14 of the light guiding member 10.

During assembly of the reflector assembly 100, the lenses 20 are secured in the sleeve 12. The cushion 16 is mounted on the tail end of the third connecting section 126. The light guiding member 10 is assembled with the clamp member 30, and the supporting bar 14 is received into the connecting hole 324 and secures with the clamp member 30.

Figure 3:
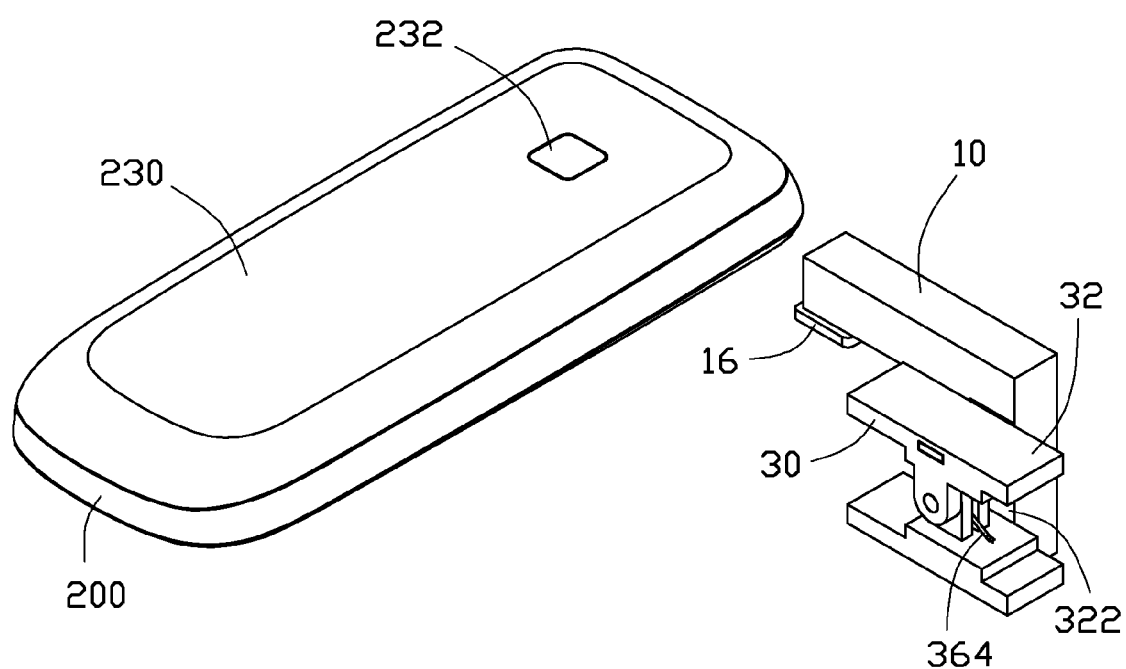
FIG. 3 is an isometric view of the reflector assembly for assembly with an electronic device.
Figure 4:
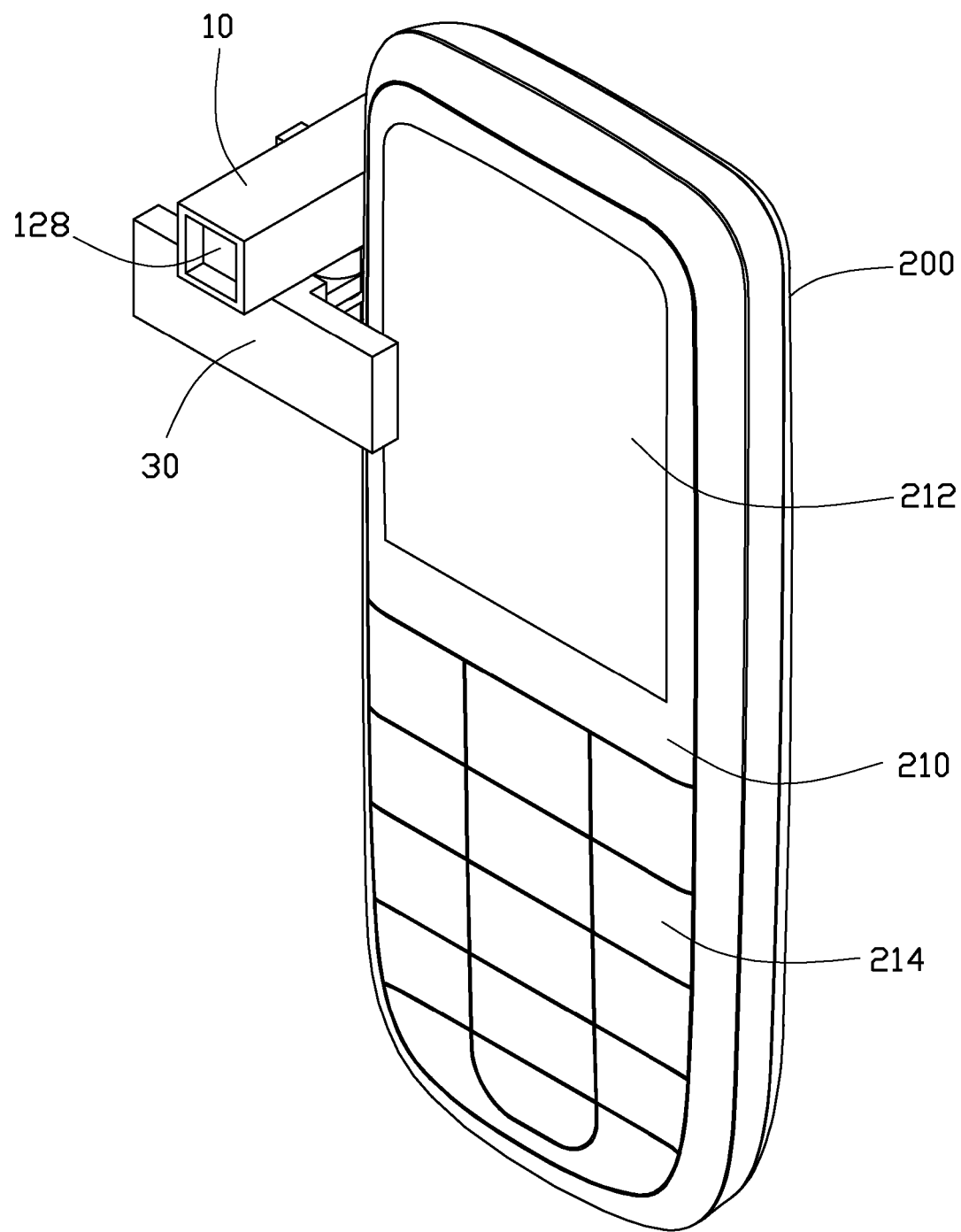
FIG. 4 is an assembled, isometric view of the reflector assembly assembled with the electronic device shown in FIG. 3.

Referring to FIGS. 3 and 4, the reflector assembly 100 can be assembled to an electronic device 200 by the clamp member 30. The electronic device 200 includes a front surface 210 and a back surface 230 opposite to the front surface 210. The front surface 210 has a display window 212 and a keypad 214, the back surface 230 has a camera module 232 exposed. The electronic device 200 can take photos by the operation of the camera module 232. The clamp member 30 clamps the electronic device 200. In this case, when the electronic device 200 is held in the clamping opening 322, the third connecting section 126 aligns with the camera module 232 and the cushion 16 resists the back surface 230. The first connecting section 122 is positioned at a side of the electronic device 200. The entrance of the first connecting section 122 and the display window 212 can face toward user at the same time.

To take photos, the user can face the front surface 210. Due to the ability of outside light to enter into the light-guiding passage 128, pass through and be reflected by the plane lens 22 and the three-prism lenses 24 into the camera module 232. Thus, the imaging light corresponding to the user appearance can be received by the camera module 232 for imaging.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A reflector assembly for use with an electronic device, comprising:
    a light guiding member including a sleeve having a light-guiding passage, a supporting bar connected with the sleeve, and a cushion assembled at an end of the sleeve;
    a light guide assembly located in the light-guiding passage to reflect imaging light;
    a clamp member; wherein the clamp member includes a first clamping board, a second clamping board and a hinge mechanism, the hinge mechanism hinges the first clamping board to the second clamping board and biases the first and the second clamping boards to clamp the electronic device, one of the first clamping board and the second clamping board defines a connecting hole to secure the supporting bar to assemble the light guiding member to the electronic device.

2. The reflector assembly as claimed in claim 1, wherein the sleeve generally includes a first connecting section, a second connecting section, and a third connecting section, the first connecting section and the third connecting section connected with the second connecting section, the first connecting section and the third connecting section are located at ends of the second connecting section.

3. The reflector assembly as claimed in claim 2, wherein the cushion is made of rubber and assembled with the third connecting section.

4. The reflector assembly as claimed in claim 2, wherein the light guide assembly includes a plane lens and two three-prism lenses, the plane lens is assembled in the entrance of the first connecting section, one of the three-prism lenses are assembled at the corner of the first connecting section and the second connecting section, the other of the three-prism lenses is assembled at the corner of the second connecting section and the third connecting section.

5. The reflector assembly as claimed in claim 1, wherein the hinge mechanism include a shaft and a torsion spring, the shaft connects the first clamping board and the second clamping board, the torsion spring is around the shaft and biased by the first clamping board and the second clamping board, the torsion spring can provide torsion force for a clamping of the first clamping board and the second clamping board.

6. A reflector assembly for use with electronic devices, comprising:
    a light guiding member having forming a light-guiding passage having a light guiding assembly therein;
    a clamp member including a first clamping board, a second clamping board and a hinge mechanism, the hinge mechanism hinging the first clamping board with the second clamping board and biasing the first and the second clamping boards to clamp the electronic device, with one of the first clamping board and the second clamping board defining a connecting hole to secure the supporting bar to assemble the light guiding member to the electronic device; and
    an electronic device having a display window formed in the front surface and a camera module formed in the back surface;
    wherein the light guiding member is assembled to the electronic device by the clamp member and one end of the light guiding member aligns with the camera module, the other end of the light guiding member extends to the front surface of the electronic device, thereby light can enter into light-guiding passage and be reflected by the light guiding assembly into the camera module.

7. The reflector assembly as claimed in claim 6, wherein the light guiding member includes a sleeve, a supporting bar connected with the sleeve, and a cushion assembled at an end of the sleeve.

8. The reflector assembly as claimed in claim 7, wherein the sleeve generally includes a first connecting section, a second connecting section, and a third connecting section, the first connecting section and the third connecting section connected with the second connecting section, the first connecting section and the third connecting section are located at opposite ends of the second connecting section.

9. The reflector assembly as claimed in claim 8, wherein cushion is made of rubber and assembled with the tail end of the third connecting section, the cushion resists the back surface of the electronic device.

10. The reflector assembly as claimed in claim 8, wherein the light guide assembly includes a plane lens and two three-prism lenses, the plane lens is assembled in the entrance of the first connecting section, one of the three-prism lenses are assembled at the corner of the first connecting section and the second connecting section, the other of the three-prism lenses is assembled at the corner of the second connecting section and the third connecting section.

11. The reflector assembly as claimed in claim 6, wherein the entrance of the first connecting section and the display window can align toward user at the same time.

\* \* \* \* \*